United States Patent [19]

Ohuchi et al.

[11] Patent Number: 5,619,641
[45] Date of Patent: Apr. 8, 1997

[54] SIGNAL PROCESSING APPARATUS INCLUDING REDUNDANT FIRST AND SECOND SYSTEM WITH A DUPLEX PACKAGE CONFIGURATION

[75] Inventors: Noriaki Ohuchi; Akio Morimoto; Hiroshi Yamasaki; Takahiro Hosokawa; Hiroyuki Kaneko, all of Kawasaki, Japan

[73] Assignee: Fujitsu Limited, Kawasaki, Japan

[21] Appl. No.: 365,982

[22] Filed: Dec. 28, 1994

Related U.S. Application Data

[63] Continuation of Ser. No. 239,923, May 9, 1994, abandoned, which is a continuation of Ser. No. 933,794, Aug. 24, 1992, abandoned.

[30] Foreign Application Priority Data

Aug. 26, 1991 [JP] Japan .................................. 3-213288

[51] Int. Cl.$^6$ ............................. G06F 11/00; G06F 11/16
[52] U.S. Cl. ................ 395/181; 395/182.05; 395/182.09
[58] Field of Search .............................. 395/181, 182.05, 395/182.09; 371/8.1, 8.2, 40.2, 62; 364/187

[56] References Cited

U.S. PATENT DOCUMENTS

| 3,303,474 | 1/1963  | Moore et al.    | 371/9.1 |
| 4,358,823 | 11/1982 | McDonald et al. | 371/9.1 |
| 4,581,701 | 4/1986  | Hess et al.     | 364/187 |
| 4,610,013 | 9/1986  | Long et al.     | 371/62  |
| 4,959,768 | 9/1990  | Gerhart         | 364/187 |
| 5,140,593 | 8/1992  | Hayashi         | 371/9.1 |

FOREIGN PATENT DOCUMENTS

| 52-40040  | 3/1977 | Japan | 371/9.1 |
| 55-102064 | 8/1980 | Japan | 371/9.1 |
| 60-83452  | 5/1985 | Japan | 371/8.1 |
| 63-128839 | 6/1988 | Japan | 371/9.1 |

OTHER PUBLICATIONS

Systems & Software, "Fault-tolerant Computers mature", Mar. 1985, pp. 117–128.

*Primary Examiner*—Hoa T. Nuguyen
*Attorney, Agent, or Firm*—Staas & Halsey

[57] ABSTRACT

A failure detection system detects a failure of a package in a redundant system having a duplex package configuration. The failure detection system includes a first package including a signal processor for carrying out a predetermined signal processing on an input signal to the first package, where the first package is provided in each of first and second systems, a second package including a selector for selectively outputting an output signal of the signal processor of the first package in one of the first and second systems in response to a control signal, a failure detector for detecting a failure in the output signal of the signal processor of the first package in each of the first and second systems and for outputting a failure detection signal if the failure is detected, and a signal processor for carrying out a predetermined signal processing on the output signal of the selector, where the second package is provided in each of first and second systems, and a controller for supplying the control signal to the selector of the second package in each of the first and second systems based on the failure detection signal received from the second package in each of the first and second systems, so that the selector selectively outputs the output signal of the signal processor of the first package in an active one of the first and second systems. The controller includes a mechanism for disregarding the failure detection signal received from the second package during a predetermined time in response to a predetermined signal. This predetermined signal may indicate which one of the first and second systems is active or, indicate whether or not the second package of each of the first and second systems is mounted on a unit to which the first package of each of the first and second systems is mounted.

9 Claims, 8 Drawing Sheets

SIGNAL PROCESSING APPARATUS INCLUDING REDUNDANT FIRST AND SECOND SYSTEM WITH A DUPLEX PACKAGE CONFIGURATION

This application is a continuation of application Ser. No. 08/239,923, filed May 9, 1994, now abandoned, which is a continuation of application Ser. No. 07/933,794, filed Aug. 24, 1992, abandoned.

BACKGROUND OF THE INVENTION

The present invention generally relates to failure detection systems, and more particularly to a failure detection system for detecting a failure of a package in a redundant system having a duplex package configuration.

In systems such as a communication processing unit which must operate continuously without interruption, the continuous operation of the system is guaranteed by employing a duplex package configuration and automatically selecting the package in the active (or operating) system. In such a system, it is desirable to enable replacement of the package without stopping the operation of the system and without affecting the operation of the system.

Therefore, there is a demand to realize a failure detection system which enables replacement of the inactive (or standby) package during system operation, that is, in the state where the power source is turned ON, without affecting the operation of the system.

Figure 1:
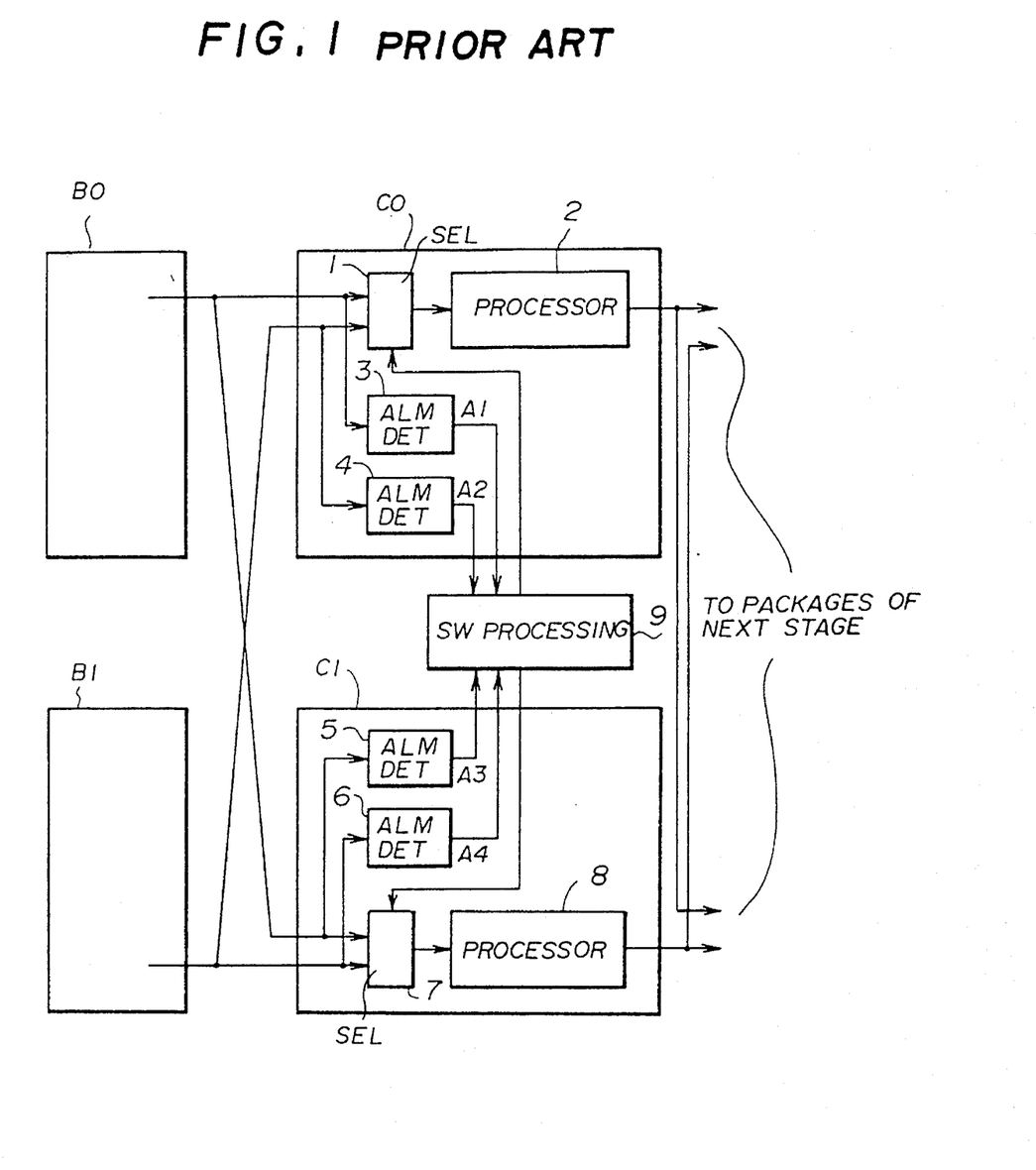
FIG. 1 is a system block diagram showing an example of a conventional failure detection system.
Figure 2:
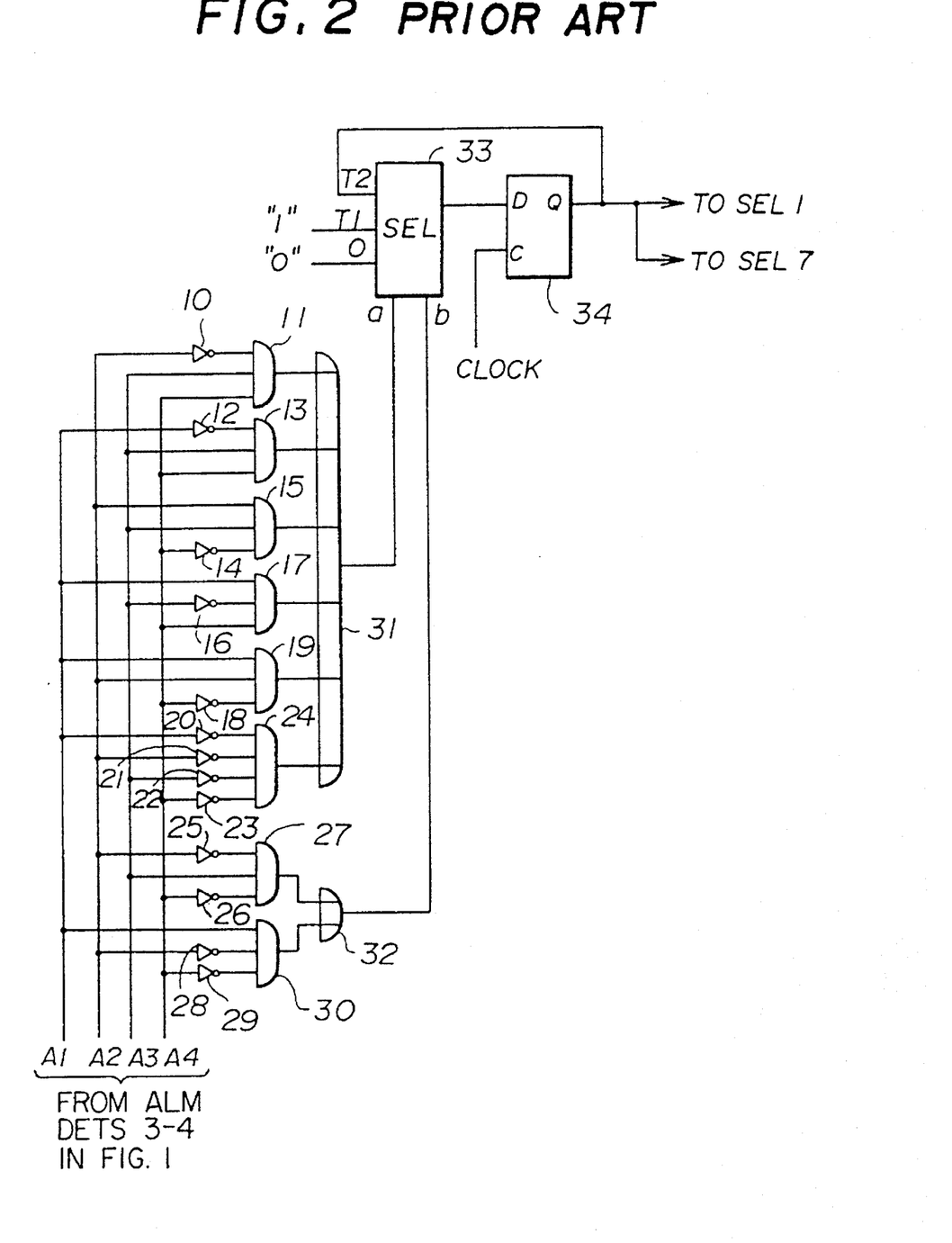
FIG. 2 is a circuit diagram showing the circuit construction of a switch processing part shown in FIG. 1.

FIG. 1 shows an example of a conventional failure detection system, and FIG. 2 shows the circuit construction of a switch processing part shown in FIG. 1.

In FIG. 1, an output signal of a circuit (not shown) which is carried on a system-0 package B0 is branched and applied to a first input terminal of each of selectors 1 and 7 which are carried on respective packages C0 and C1. The packages C0 and C1 are provided in a stage subsequent to the stage in which the packages B0 and B1 are provided. Similarly, an output signal of a circuit (not shown) which is carried on the system-1 package B1 is branched and applied to a second input terminal of each of the selectors 1 and 7 which are carried on the respective packages C0 and C1.

In the package C0, the output signals of the packages B0 and B1 which are input to the selector 1 are respectively branched and applied to alarm detectors 3 and 4. The alarm detectors 3 and 4 monitor the respective input signals and output alarms A1 and A2 to a switch processing part 9 if a failure is detected.

Similarly, in the package C1, the output signals of the packages B0 and B1 which are input to the selector 7 are respectively branched and applied to alarm detectors 5 and 6. The alarm detectors 5 and 6 monitor the respective input signals and output alarms A3 and A4 to the switch processing part 9 if a failure is detected.

The switch processing part 9 outputs selection signals for switching the selectors 1 and 7 based on the alarms A1 and A2 from the package C0 and the alarms A3 and A4 from the package C1, and depending on the state of the alarms as shown in Table 1. The selectors 1 and 7 respectively output the input signals from one of the packages B0 and B1 in response to the respective selection signals.

TABLE 1

| | | State of Alarm | | | | |
|---|---|---|---|---|---|---|
| | | A1 | A2 | A3 | A4 | State of Selection |
| (1) | | O | O | O | O | previous System |
| | | O | O | O | X | System-0 |
| (3) | | O | O | X | O | System-1 |
| | | O | O | X | X | — |
| | | O | X | O | O | System-0 |
| | | O | X | O | X | System-0 |
| | | O | X | X | O | — |
| | | O | X | X | X | — |
| | | X | O | O | O | System-1 |
| | | X | O | O | X | — |
| | | X | O | X | O | System-1 |
| | | X | O | X | X | — |
| | | X | X | O | O | — |
| | | X | X | O | X | — |
| | | X | X | X | O | — |
| (2) | | X | X | X | X | System-0 |

In Table 1 above, "O" indicates the normal state where no alarm is generated, and "X" indicates the state where the alarm is generated. A description will not be given of the cases where the alarm is or is not generated, by referring to FIG. 2 which shows the circuit construction of the switch processing part 9.

In FIG. 2, in the normal state where none of the alarms A1 through A4 are generated as indicated by (1) in Table 1, for example, a signal "0" indicating the normal state is converted into a signal "1" via inverters 20, 21 and 23 and is applied to an AND circuit 24. Since all of the four input signals of the AND circuit 24 are "1" a signal "1" is output from the AND circuit 24. The signal "1" from the AND circuit 24 is applied to a terminal a of a selector 33 via an OR circuit 31. On the other hand, because output signals of AND circuits 27 and 30 are both "0" a signal "0" is applied to a terminal b of the selector 33 via an OR circuit 32.

Table 2 shows the relationship of the input signals and the output signal of the selector 33. In the above described case, the signals "1" and "0" are respectively applied to the terminals a and b of the selector 33. Hence, as may be seen from Table 2, the selector 33 selects and outputs the signal from an input terminal T2 and applies this signal to a terminal D of a flip-flop circuit 34. The flip-flop circuit 34 outputs this incoming signal from the terminal D from an output terminal Q in response to a clock which is applied to a terminal C. The output signal of the flip-flop circuit 34 from the terminal Q is applied to the selectors 1 and 7 shown in FIG. 1 as the selection signals. In this case, the switch processing part 9 feeds back the signal from the terminal Q of the flip-flop circuit 34 to the input terminal T2 of the selector 33, so that the signal is output again via the selector 33 and the flip-flop circuit 34. Hence, as indicated by (1) in Table 1, the state of the immediately previous system is selected.

TABLE 2

| Terminal a | Terminal b | Selection State |
|---|---|---|
| "0" | "0" | Select "0"-input |
| "0" | "1" | Select T1-input |
| "1" | "0" | Select T2-input |
| "1" | "1" | — |

On the other hand, in the case where all of the alarms A1 through A4 are generated as indicated by (2) in Table 1, a signal "1" which indicates the generation of the alarm is inverted into a signal "0" before being applied to each of AND circuits 11, 13, 15, 17, 19, 24, 27 and 30 shown in FIG. 2. Hence, a signal "0" is applied to both the terminals a and b of the selector 33. From Table 2, when the signal "0" is applied to both the terminals a and b of the selector 33, the selector 33 selects the "0"-input and applies this signal "0" to the terminal D of the flip-flop circuit 34.

The signal "0" applied to the terminal D is output from the terminal Q of the flip-flop circuit 34 responsive to the clock which is applied to the terminal C. The output signal of the flip-flop circuit 34 from the terminal Q is applied to the selectors 1 and 7 shown in FIG. 1 as the selection signals. As a result, the selectors 1 and 7 select the system-0, that is, select and output the input signal from the package B0 to a processor 2 of the package C0.

In cases where the alarms A1 through A4 assume states other than those described above, the immediately previous system, the system-0 or the system-1, is selected depending on the states of the alarms A1 through A4 shown in Table 1.

For example, when the output signal of the package B0 is branched and input to the alarm detectors 3 and 5 of the packages C0 and C1, a failure may be detected in one of the alarm detectors 3 and 5 but not in the other. Such a case is indicated by a symbol "—" in Table 1 under the column "State of Selection". Such a case normally does not occur, but the immediately previous system may be selected if it does occur. Here, the "immediately previous system" refers to the package which is of the same system-0 or system-1 to which a certain package belongs but is located at a stage immediately preceding the certain package.

Conventionally, the switching of the packages was made in response to the failure detection in the above described manner.

However, according to the conventional failure detection system, the switch processing part 9 carries out a switching process when a failure is detected in the active package, regardless of which package is active and which package is inactive. In other words, if it is assumed for the sake of convenience that the packages B0 and C0 of the system-0 are active in FIG. 1, a failure of the package B0 may be erroneously detected in the package C1 when the package C1 is disconnected or connected for replacement purposes. However, the switch processing part 9 in this case has no means of determining whether or not the alarm A3 from the package C1 is generated in error. As a result, the switch processing part 9 controls the selectors 1 and 7 of the packages C0 and C1 so as to select the system-1 in response to the alarm A3.

Therefore, although the package B0 of the system-0 is operating normally in this case, a switching is made by the switch processing part 9. Consequently, there is a problem in that the active package and the operation of the active package are affected when the inactive package is disconnected or connected for replacement purposes.

SUMMARY OF THE INVENTION

Accordingly, it is a general object of the present invention to provide a novel and useful failure detection system in which the problems described above are eliminated.

Another and more specific object of the present invention is to provide a failure detection system for detecting a failure of a package in a redundant system having a duplex package configuration, comprising a first package including a signal processor for carrying out a predetermined signal processing on an input signal to the first package and for outputting an output signal, where the first package is provided in each of first and second systems, a second package including a selector for selectively outputting the output signal of the signal processor of the first package in one of the first and second systems in response to a control signal, a failure detector for detecting a failure in the output signal of the signal processor of the first package in each of the first and second systems and for outputting a failure detection signal if the failure is detected, and a signal processor for carrying out a predetermined signal processing on the output signal of the selector, where the second package is provided in each of first and second systems, and control means, coupled to at least the second package of each of the first and second systems, for supplying the control signal to the selector of the second package in each of the first and second systems based on the failure detection signal received from the second package in each of the first and second systems, so that the selector selectively outputs the output signal of the signal processor of the first package in an active one of the first and second systems, where the control means includes means for disregarding the failure detection signal received from the second package during a predetermined time in response to a predetermined signal. According to the failure detection system of the present invention, it is possible to replace an inactive package during operation of the system without affecting the system operation.

Still another object of the present invention is to provide the failure detection system described above wherein the predetermined signal indicates which one of the first and second systems is active.

A further object of the present invention is to provide the failure detection system described first wherein the predetermined signal indicates whether or not the second package of each of the first and second systems is mounted on a unit to which the first package of each of the first and second systems is mounted.

Other objects and further features of the present invention will be apparent from the following detailed description when read in conjunction with the accompanying drawings.

DESCRIPTION OF THE PREFERRED EMBODIMENTS

Figure 3:
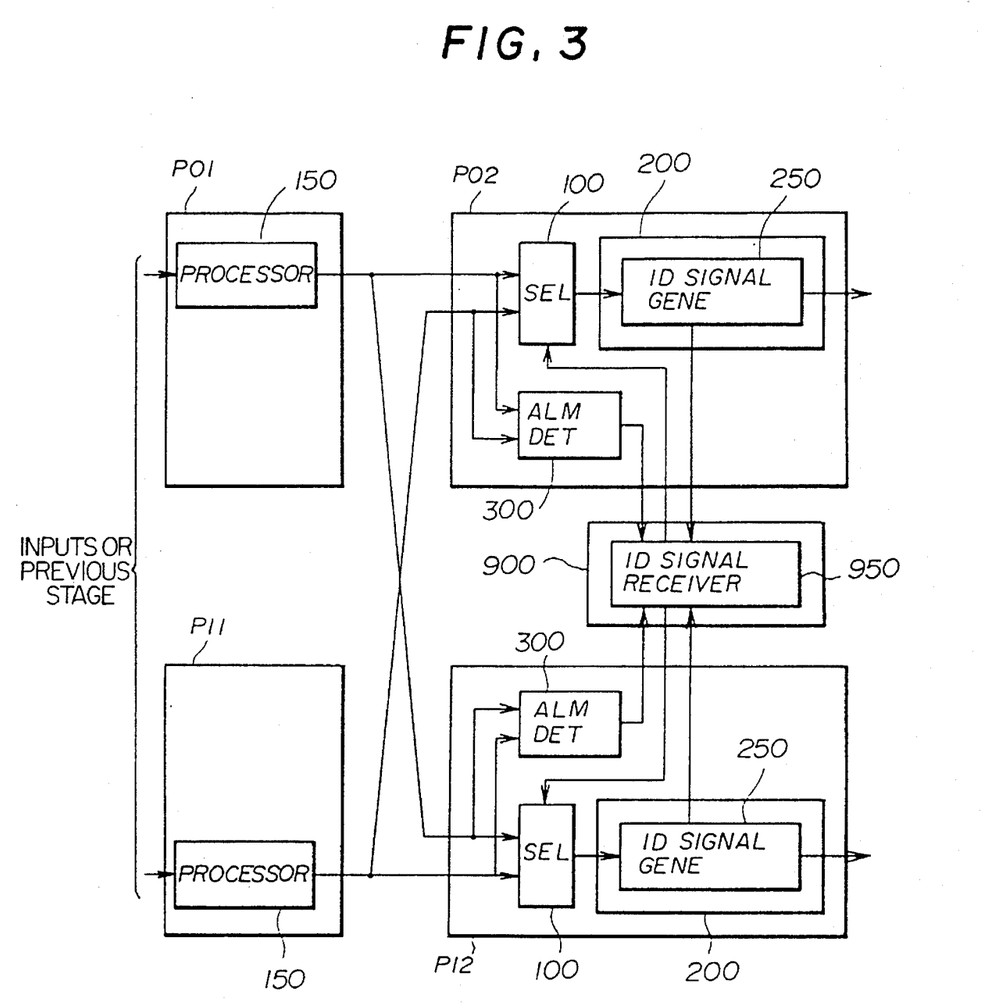
FIG. 3 is a system block diagram for explaining one aspect of the present invention.
Figure 4:
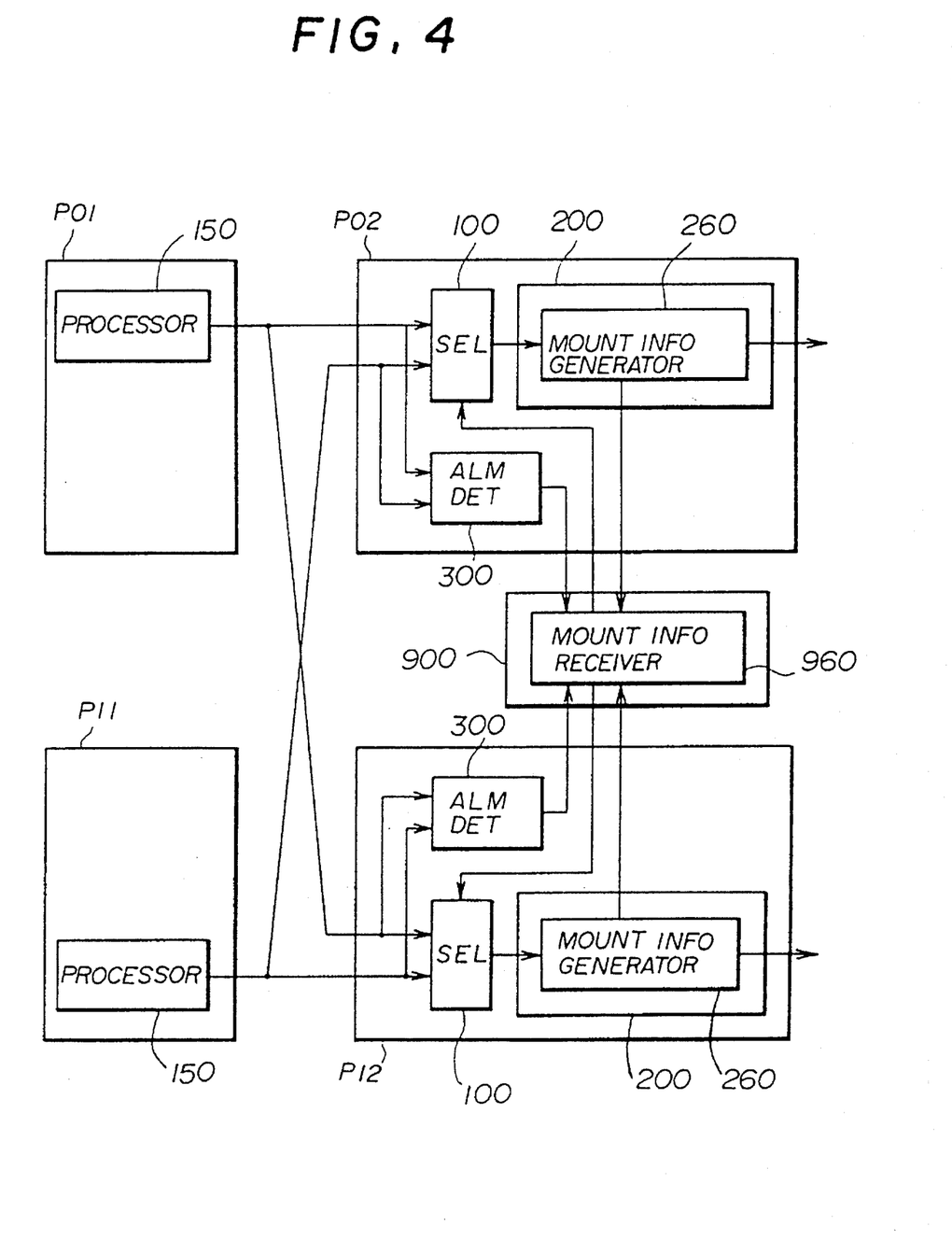
FIG. 4 is a system block diagram for explaining another aspect of the present invention.

First, a description will be given of two basic aspects of the present invention, by referring to FIGS. 3 and 4. FIG. 3 is a system block diagram for explaining a first aspect of the present invention, and FIG. 4 is a system block diagram for explaining a second aspect of the present invention.

In FIG. 3, a failure detection system includes first and second packages P01 and P02 of the system-0, first and second packages P11 and P12 of the system-1, and a control part 900. A signal processor 150 for carrying out a predetermined signal processing is provided in each of the first packages P01 and P11. A selector 100, a signal processor 200 and a failure detector 300 are provided in each of the second packages P02 and P12.

An output signal of the signal processor 150 of the first package P01 is branched and supplied to the selectors 100 and the failure detectors 300 of the second packages P02 and P12, and an output signal of the signal processor 150 of the first package P11 is is branched and supplied to the selectors 100 and the failure detectors 300 of the second packages P02 and P12. The selector 100 selects and outputs the output signal from one of the first packages P01 and P11, and the signal processor 200 carries out a predetermined signal processing on the output signal of the selector 100.

The controller 900 receives failure detection signals from the failure detectors 300 of the second packages P02 and P12, and outputs control signals to the selectors 100 of the second packages P02 and P12 in response to the failure detection signals.

The signal processor 200 includes an identification signal generator 250 for generating an identification signal which indicates whether or not the second package to which the signal processor 200 belongs is active or inactive. This identification signal is supplied to the controller 900. On the other hand, an identification signal receiver 950 is provided in the controller 900. The identification signal receiver 950 invalidates the failure detection signal which is received from the inactive package for a predetermined time based on the identification signal which is received from the identification signal generator 250.

In FIG. 3, if it is assumed for the sake of convenience that the first and second packages P01 and P02 of the system-0 are active, the identification signal generator 250 of the signal processor 200 in the second package P02 of the system-0 outputs an identification signal which indicates that the system-0 packages are active. This identification signal is applied to the controller 900.

The identification signal receiver 950 of the controller 900 receives the identification signal which is output from the identification signal generator 250. The identification signal receiver 950 outputs a control signal which invalidates the failure detection signal which is output from the inactive package of the system-1 in this case, and applies this control signal to the selectors 100 of the second packages P02 and P12.

The selector 100 selects and outputs the input signal from the signal processor 150 of the first package P01 of the system-0 in response to the control signal which is received from the identification signal receiver 950. In this case, the inactive package of the system-1 is replaced by a new package during the predetermined time in which the controller 900 invalidates the failure detection signal which is output from the inactive package of the system-1.

As a result, it is possible to replace the inactive package during the system operation and without affecting the operation of the active package.

Next, a description will be given of the second aspect of the present invention, by referring to FIG. 4. In FIG. 4, those parts which are the same as those corresponding parts in FIG. 3 are designated by the same reference numerals, and a description thereof will be omitted. In FIG. 4, a mount information generator 260 is provided in the signal processor 200 of each of the second packages P02 and P12.

The mount information generator 260 generates mount information which indicates whether or not the package to which the mount information generator 260 belongs is mounted to a unit (not shown) such as the communication processing unit. This mount information is supplied to the controller 900.

A mount information receiver 960 is provided in the controller 900. This mount information receiver 960 receives the mount information output from the mount information generator 260, and invalidates the failure detection signal which is received from the inactive package for a predetermined time based on a change in the mount information which is received from the mount information generator 260.

In FIG. 4, if it is assumed for the sake of convenience that the first and second packages P01 and P02 of the system-0 are active, the second package P12 of the system-1 may be removed and replaced by a new package. In this case, the mount information generator 260 of the signal processor 200 in the second package P12 of the system-1 outputs the mount information which indicates that the second package P12 of the system-1 has been removed from the unit. This mount information is applied to the controller 900.

The mount information receiver 960 of the controller 900 receives the mount information which is output from the mount information generator 260. The mount information receiver 960 outputs a control signal which invalidates the failure detection signal which is output from the inactive second package P12 of the system-1 in this case, and applies this control signal to the selectors 100 of the second packages P02 and P12.

The selector 100 selects and outputs the input signal from the signal processor 150 of the first package P01 of the system-0 in response to the control signal which is received from the mount information receiver 960. In this case, the inactive package of the system-1 is replaced by a new package during the predetermined time in which the controller 900 invalidates the failure detection signal which is output from the inactive second package P12 of the system-1.

As a result, it is possible to replace the inactive package during the system operation and without affecting the operation of the active package.

Figure 5:
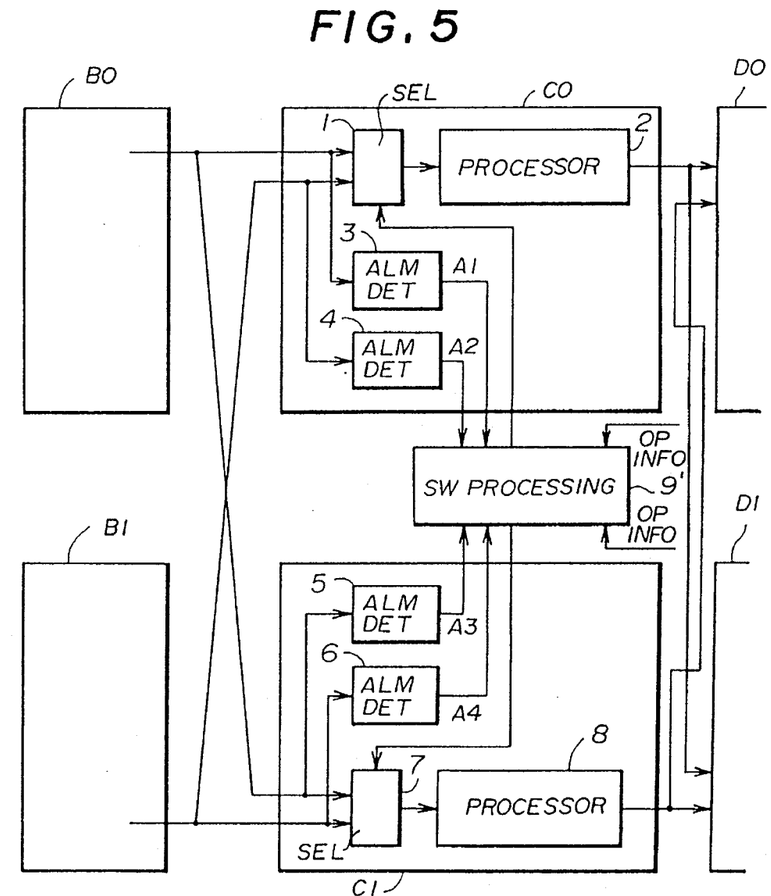
FIG. 5 is a system block diagram showing a first embodiment of a failure detection system according to the present invention.
Figure 6:
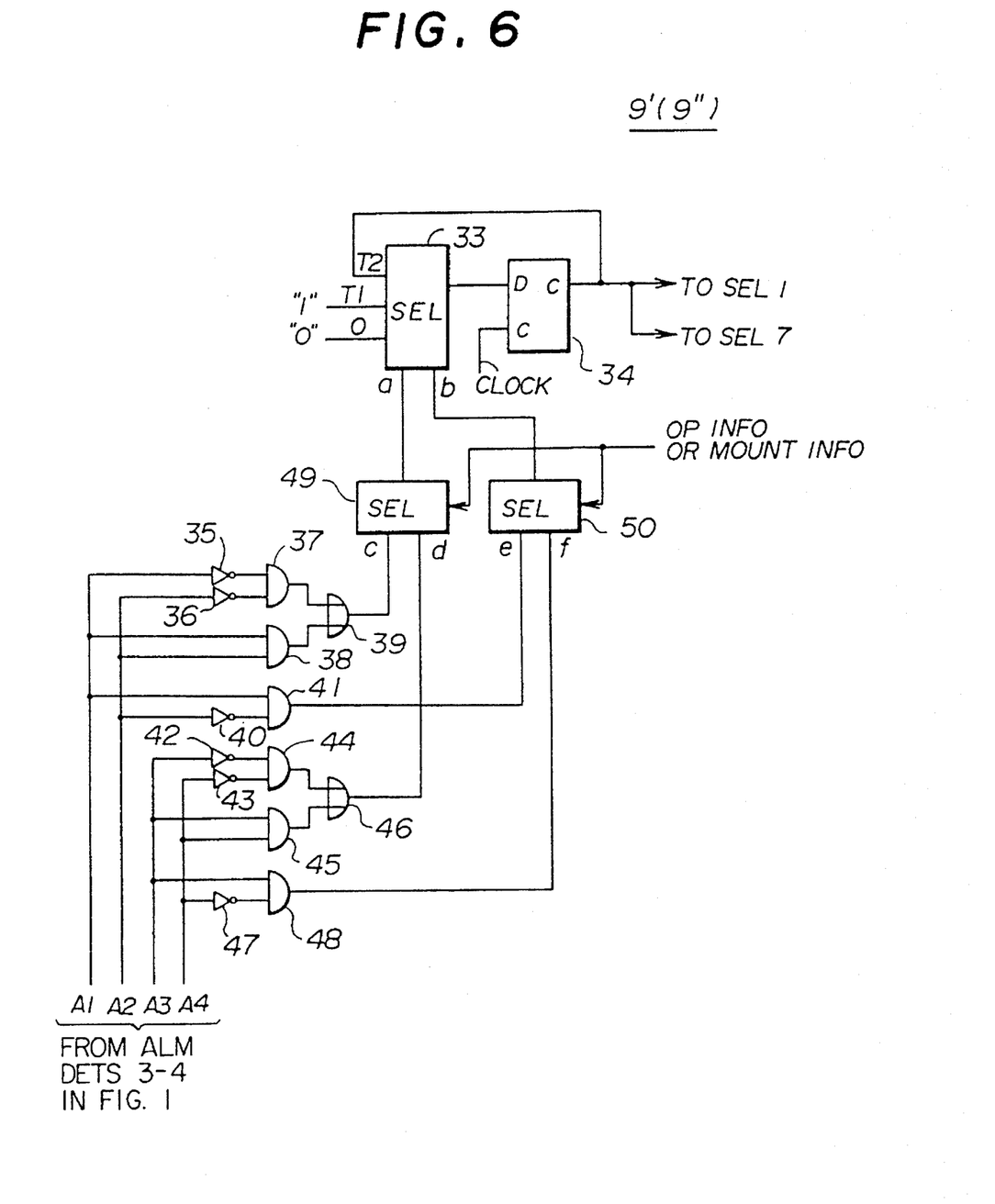
FIG. 6 is a system block diagram showing an embodiment of the circuit construction of a switch processing part shown in FIG. 5.

Next, a description will be given of a first embodiment of the failure detection system according to the present invention, by referring to FIGS. 5 and 6. FIG. 5 shows the block system of the first embodiment, and FIG. 6 shows the circuit construction of a switch processing part shown in FIG. 5. In FIGS. 5 and 6, those parts which are the same as those corresponding parts in FIGS. 1 and 2 are designated by the same reference numerals, and a description thereof will be omitted. This embodiment employs the first aspect of the present invention described above in conjunction with FIG. 3.

This first embodiment differs from the conventional failure detection system shown in FIG. 1 in that this embodiment sends operational information to the switch processing part from each package and the switch processing part disregards the failure detection signal which is received from the inactive package.

It will be assumed for the sake of convenience that in FIG. 3, the packages B0 and C0 of the system-0 are the active packages. In this case, the signals input from the circuits (not shown) which are mounted on the packages B0 and B1 of the previous stage are branched and applied to the selector 1 and the alarm detectors 3 and 4 of the package C0. The alarm detectors 3 and 4 monitor the input signals and output the alarms A1 and A2 when a failure is detected. The alarms A1 and A2 are supplied to a switch processing part 9'. At the same time, operational information which in this case indicates that the package C0 is active is applied to the switch processing part 9'.

Similarly, the signals input from the circuits (not shown) which are mounted on the packages B0 and B1 of the previous stage are branched and applied to the selector 7 and the alarm detectors 5 and 6 of the package C1. The alarm detectors 5 and 6 monitor the input signals and output the alarms A3 and A4 when a failure is detected. The alarms A3 and A4 are supplied to the switch processing part 9'. At the same time, operational information which in this case indicates that the package C1 is inactive is applied to the switch processing part 9'.

Table 3 shows the relationship between the state of the alarms A1 through A4 and the state of selection in this embodiment for the case where the system-0 package is active.

TABLE 3

| | State of Alarm | | | | |
|---|---|---|---|---|---|
| | A1 | A2 | A3 | A4 | State of Selection |
| | O | O | O | O | Previous System |
| | O | O | O | X | Previous System |
| (1) | O | O | X | O | Previous System |
| | O | O | X | X | Previous System |
| | O | X | O | O | System-0 |
| | O | X | O | X | System-0 |
| | O | X | X | O | System-0 |
| | O | X | X | X | System-0 |
| | X | O | O | O | System-1 |
| | X | O | O | X | System-1 |
| | X | O | X | O | System-1 |
| | X | O | X | X | System-1 |
| | X | X | O | O | — |
| | X | X | O | X | — |
| | X | X | X | O | — |
| | X | X | X | X | — |

In the case (a) shown in Table 3, none of the alarms A1, A2 and A4 are generated as indicated by "O" but the alarm A3 is generated as indicated by "X". In this case, the alarms A1, A2 and A4 which indicate the normal state respectively are signals "0" in FIG. 6 which shows the circuit construction of the switch processing part 9". Hence, signals "1" are output from AND circuits 37, 44 and 48. For this reason, signals "1" are respectively applied to terminals c and d of a selector 49 via OR circuits 39 and 46. In addition, signals "0" and "1" are respectively applied to terminals e and f of a selector 50.

On the other hand, the operational information related to the packages C0 and C1 are applied to the selectors 49 and 50. Since the packages B0 and C0 are active and the packages B1 and C1 are inactive in this case, the alarms A3 and A4 from the inactive packages B0 and C0 must be disregarded. In other words, in the selectors 49 and 50, the input signals to the terminals d and f are disregarded, and the selectors 49 and 50 respectively select and output the input signals "1" and "0" which are applied to the terminals c and e. The selectively output signals "1" and "0" from the selectors 49 and 50 are respectively applied to the terminals a and b of the selector 33.

Because the signals "1" and "0" are respectively applied to the terminals a and b, the selector 33 selects and outputs the input T2 from the Table 2. The output signal of the selector 33 is applied to the terminal D of the flip-flop circuit 34 and is output from the terminal Q in response to the clock which is applied to the terminal C. The signal output from the terminal Q of the flip-flop circuit 34 is fed back to the terminal T2 of the selector 33, which means that the signal output from the terminal Q indicates the selection of the immediately previous system. Here, the "immediately previous system" refers to the package which is of the same system-0 or system-1 to which a certain package belongs but is located at a stage immediately preceding the certain package. The signal output from the terminal Q of the flip-flop circuit 34 is applied to the selector 1 of the package C0 and the selector 8 of the package C1 shown in FIG. 5.

The selector 1 of the package C0 selects and outputs the input signal from the immediately previous system, that is, the input signal from the package B0 in this case, and applies the output signal to the processor 2. As a result, because the alarms A3 and A4 from the inactive package C1 are disregarded, it is possible to prevent an erroneous operation even if the inactive package C1 is removed for the purpose of replacement.

On the other hand, according to the conventional failure detection system, the system-1 is selected if the alarms A1, A2 and A4 are not generated as indicated by "O" and the alarm A3 is generated as indicated by "X" in the case (3) shown in Table 1.

In cases where the alarms A1 through A4 assume states other than those described above, the immediately previous system, the system-0 or the system-1, is selected depending on the states of the alarms A1 through A4 shown in Table 3.

For example, when the output signal of the package B0 is branched and input to the alarm detectors 3 and 5 of the packages C0 and C1, a failure may be detected in one of the alarm detectors 3 and 5 but not in the other. Such a case is indicated by a symbol "—" in Table 3 under the column "State of Selection". Such a case normally does not occur, but the immediately previous system may be selected if it does occur.

In this embodiment, it is possible to similarly cope with the case where the system-0 package is replaced during operation of the system-1 package. The relationship between the state of the alarms A1 through A4 and the state of selection for the case where the system-1 package is active is shown in Table 4.

TABLE 4

| | State of Alarm | | | | |
|---|---|---|---|---|---|
| | A1 | A2 | A3 | A4 | State of Selection |
| | O | O | O | O | Previous System |
| | O | O | O | X | System-0 |
| | O | O | X | O | System-1 |
| | O | O | X | X | — |
| (1) | O | X | O | O | Previous System |
| | O | X | O | X | System-0 |
| | O | X | X | O | System-1 |
| | O | X | X | X | — |
| | X | O | O | O | Previous System |
| | X | O | O | X | System-0 |
| | X | O | X | O | System-1 |
| | X | O | X | X | — |
| | X | X | O | O | Previous System |
| | X | X | O | X | System-0 |
| | X | X | X | O | System-1 |

TABLE 4-continued

| | State of Alarm | | | |
|---|---|---|---|---|
| A1 | A2 | A3 | A4 | State of Selection |
| X | X | X | X | — |

The operational information may be generated based on various kinds of information. However, in order to simplify the circuit construction, a control signal which is supplied to a selector 1 of a package D0 which is provided at a stage immediately subsequent to the package C0 may be used as the operational information related to the package C0, because the control signal supplied to the selector 1 of the package D0 indicates which one of the system-0 and system-1 is active. In this case, the the control signal which is supplied to the selector 1 of the package D0 from another switch processing part 9' provided for the packages D0 and D1 is also supplied as it is to the switch processing part 9' provided for the packages C0 and C1 if one switch processing part 9' is provided with respect to each stage of the system-0 and system-1. But if a single switch processing part 9' is designed to receive the alarms from all of the packages and supply the control signals to all of the selectors of the packages, the control signal which is supplied to the selector of the package at an ith stage of a system-j may be used as the operational information from the processor of the package at an (i–1)th stage of the system-j.

Figure 7:
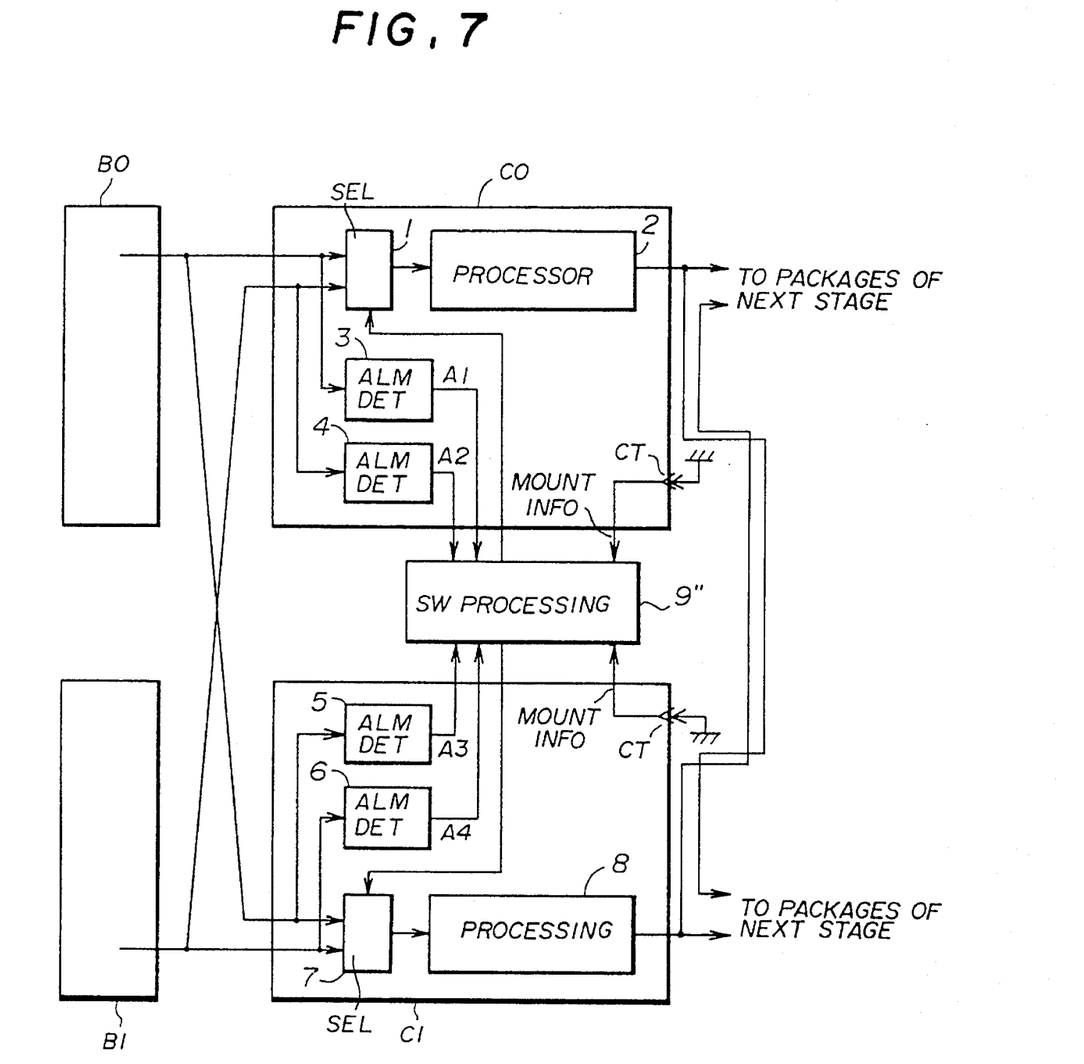
FIG. 7 is a system block diagram showing a second embodiment of the failure detection system according to the present invention.
Figure 8:
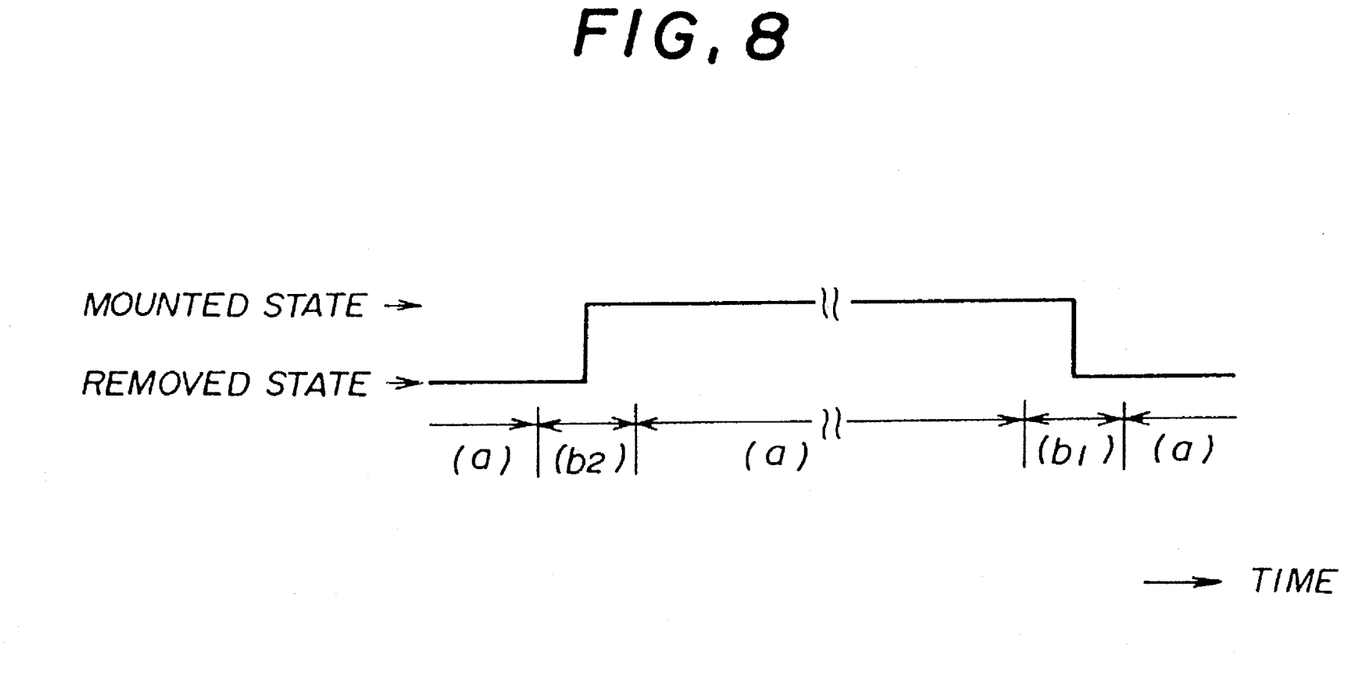
FIG. 8 is a diagram for explaining the operation of a switch processing part shown in FIG. 7.

Next, a description will be given of a second embodiment of the failure detection system according to the present invention, by referring to FIGS. 7 and 8. FIG. 7 shows the block system of the second embodiment, and FIG. 8 shows the effective operation time of a switch processing part of the second embodiment. In FIG. 7, those parts which are the same as those corresponding parts in FIGS. 1 and 5 are designated by the same reference numerals, and a description thereof will be omitted.

In the first embodiment, the switch processing part 9' disregards the alarms from the inactive package based on the operational information, so as to prevent an erroneous operation of the system when the inactive package is replaced by a new package. On the other hand, in the second embodiment, mount information is supplied to a switch processing part 9" and the switch processing part 9" disregards the alarms from the inactive package based on the mount information.

In FIG. 7, the packages C0 and C1 are respectively provided with a connector CT which connects to the ground level of the unit when the packages C0 and C1 are mounted on the unit. This connector CT is coupled to the switch processing part 9". If the package C0 is removed from the unit, for example, the connector CT of the package C0 is no longer the ground level. For example, measures may be taken so that the connector CT assumes a high level of 5 V if the connector CT is disconnected from the unit. This potential information from the connector CT is supplied to the switch processing part 9" as the mount information. The switch processing part 9" may have the same circuit construction as the switch processing part 9' shown in FIG. 6.

If the system-1 is active and the alarms A1, A3 and A4 are not generated as indicated by "0" and the alarm A2 is generated as indicated by "X" in the case (1) shown in Table 4, for example, the alarms A1, A3 and A4 are "0" and the alarm A2 is "1" in FIG. 6. Hence, a signal "1" is output from the AND circuit 44 in this case, and signals "0" are output from the AND circuits 37, 38, 41, 45 and 48. Accordingly, signals "0" and "1" are respectively applied to the terminals c and d of the selector 49 via the OR circuits 39 and 46, and signals "0" are applied to the terminals e and f of the selector 50.

On the other hand, the mount information from the packages C0 and C1 are respectively applied to the selectors 49 and 50. In this particular case, the packages B1 and C1 are active and the package C1 still remains mounted on the unit. Hence, the ground voltage is applied to the selectors 49 and 50. In addition, because the packages B0 and C0 are inactive, the potential of the connector CT changes from the ground level to the high level (for example, 5 V) when the inactive package C0 is removed from the unit to be replaced by a new package. This high-level signal from the inactive package C0 is supplied to the selectors 49 and 50 of the switch processing part 9" as the mount information.

A counter (not shown) of the switch processing part 9" starts to count from the time when the high-level signal from the package C0 is received at the selectors 49 and 50 as indicated by (b1) in FIG. 8, and disregards the alarms A1 and A2 from the package C0 until a predetermined time elapses. In other words, the alarms A1 and A2 are invalidated for the predetermined time. In FIG. 8, (a) denotes a time in which the alarms are valid, while (b1) and (b2) denote times in which the alarms are invalid.

Therefore, in this case, the selectors 49 and 50 shown in FIG. 6 disregard the input signals to the terminals c and e during this predetermined time, and select and output the input signals to the terminals d and f. In this case, the signals "1" and "0" are respectively input to the terminals d and f of the selectors 49 and 50. The output signals of the selectors 49 and 50 are respectively applied to the terminals a and b of the selector 33.

Because the signals "1" and "0" are respectively input to the terminals a and b of the selector 33, the selector 33 selects and outputs the input signal to the terminal T2 based on Table 2. The output signal of the selector 33 is applied to the terminal D of the flip-flop circuit 34 and is output from the terminal Q in response to the clock which is applied to the terminal C. The signal output from the terminal Q of the flip-flop circuit 34 is fed back to the terminal T2 of the selector 33, which means that the signal output from the terminal Q indicates the selection of the immediately previous system. The signal output from the terminal Q of the flip-flop circuit 34 is applied to the selector 1 of the package C0 and the selector 7 of the package C1.

The selector 7 of the package C1 selects and outputs the input signal from the system-1 based on the selection signal which is output from the switch processing part 9'. As a result, because the alarms A1 and A2 from the inactive package C0 are disregarded for the predetermined time, it is possible to prevent erroneous operation of the system even when the inactive package C0 is removed from the unit.

On the other hand, the alarms A1 and A2 from the inactive package C0 may be disregarded for the predetermined time as indicated by (b2) in FIG. 8 when the inactive package C0 is mounted on the unit to replace an old package. The effect of preventing the erroneous operation of the system is similar to that of the above described case, except that a counter (not shown) of the switch processing part 9" in this case starts to count from the time when the signal from the connector CT falls to the ground level.

Therefore, by invalidating the alarms A1 and A2 from the inactive package C0, it is possible to prevent erroneous operation of the system when the inactive package C0 is replaced by a new package.

Further, the present invention is not limited to these embodiment, but various variations and modifications may be made without departing from the scope of the present invention.

What is claimed is:

1. A signal processing apparatus including redundant first and second systems having a duplex package configuration, said signal processing apparatus comprising:

at least two first packages, at least one of the first packages being provided in each of the redundant first and second systems, each of the first packages including a signal processor to provide a first package output signal;

at least two second packages, at least one of the second packages being provided in each of the redundant first and second systems, each of the second packages including:
 a selector operatively connected to the first packages of the redundant first and second systems to select the first package output signal of one of the redundant first and second systems to provide a selected signal in response to a control signal,
 a failure detector operatively connected to the first packages of the redundant first and second systems to receive the first package output signal and output a failure detection signal if a failure is detected, and
 a signal processor operatively connected to said selector to receive the selected signal and to output a second package output signal;

at least two third packages, at least one of the third packages being provided in each of the redundant first and second systems, each of the third packages operatively connected to receive the second package output signal from said signal processor in a corresponding one of the at least two second packages, performing at least one operation on the second package output signal and producing operation information signals indicating operational status of the at least two third packages, respectively; and a controller coupled to each of the second packages in the redundant first and second systems to receive the failure detection signal from said failure detector in each of the second packages in the redundant first and second systems, to provide the control signal to said selector of each of the second packages in the redundant first and second systems for selecting said signal processor of one of the at least one of the first packages in an active one of the redundant first and second systems and said controller disregarding the failure detection signal during a predetermined time in response to at least one of the operation information signals.

2. The signal processing apparatus as claimed in claim 1, wherein the second package output signal indicates which one of the first and second systems is active.

3. The signal processing apparatus as claimed in claim 2, wherein the operation information signals produced by the at least two third packages indicate an active one of the redundant first and second systems, at least one of the third packages in one of the redundant first and second systems including a selector for selectively outputting an output signal of said signal processor of one of the second packages in one of the redundant first and second systems in response to one of the operation information signals.

4. The signal processing apparatus as claimed in claim 3, wherein said controller generates the control signal supplied to said selector of the at least one of the third packages.

5. The signal processing apparatus as claimed in claim 1, wherein said system further comprises a unit to which the first and second packages of each of the redundant first and second systems can be mounted; and wherein each of the at least two second packages receives a second package identification signal indicating whether the second package of each of the redundant first and second systems is mounted on the unit to which the redundant first package of each of the first and second systems is mounted.

6. The signal processing apparatus as claimed in claim 5, wherein the second package includes a connector having a particular potential when the second package is mounted on the unit, and the potential of the connector of the second package is used as the second package identification signal.

7. The signal processing apparatus as claimed in claim 6, wherein the particular potential is a ground potential.

8. The signal processing apparatus as claimed in claim 1, wherein said system further comprises a unit to which the first and second packages of each of the redundant first and second systems can be mounted; and wherein the predetermined time is set so that disconnection of the second package in an inactive one of the redundant first and second systems from the same unit on which the first package of each of the redundant first and second systems are mounted causes no erroneous selection at the selector of the second package in response to the control signal.

9. A redundant system for processing signals, comprising:

a first system, including
 a first package with a first signal processor operatively connected to receive a first input signal and operating on the first input signal to produce a first package output signal; and
 a second package including
  a second signal processor operatively connected to receive a first selected signal, operating on the first selected signal to produce a first output signal of said redundant system, and producing a first identification signal;
  a first selector receiving a first control signal and a third package output signal and operatively connected to said first signal processor to receive the first package output signal and to said second signal processor to supply one of the first and third package output signals as the first selected signal in dependence on the first control signal; and
  a first failure detector operatively connected to receive the third package output signal and to said first signal processor to receive the first package output signal and outputting a first failure detection signal if failure is detected;

a second system, including
 a third package with a third signal processor operatively connected to receive a second input signal and to said first selector and operating on the second input signal to produce the third package output signal; and
 a fourth package including
  a second selector operatively connected to receive a second control signal and to said first and third signal processors to receive the first and third package output signals and outputting one of the first and third package output signals as a second selected signal in dependence upon the second control signal;
  a second failure detector operatively connected to said first and third signal processors to receive the first and third package output signals and outputting a second failure detection signal if failure is detected; and a fourth signal processor operatively connected to said second selector to receive the second selected signal, operating on the second selected signal to produce a second output signal of said redundant system, and producing a second identification signal; and a controller operatively connected to said first and second failure detectors to receive the first and second failure detection signals, to said second and fourth signal processors to receive the first and second identification signals and to said first and second selectors to supply the first and second control signals indicating an active one of the first and second systems in dependence on the first and second failure detection signals a predetermined time following receipt of one of the first and second identification signals.

\* \* \* \* \*

UNITED STATES PATENT AND TRADEMARK OFFICE
CERTIFICATE OF CORRECTION

PATENT NO.   :   5,619,641
DATED        :   Apr. 8, 1997
INVENTOR(S)  :   OHUCHI et al.

It is certified that error appears in the above-indentified patent and that said Letters Patent is hereby corrected as shown below:

TITLE PAGE: [56] References Cited

Under "U.S. PATENT DOCUMENTS" add the following:

3,833,890  9/1974  Tournier et al.
        4,049,957  9/1977  Kera et al.

Under "FOREIGN PATENT DOCUMENTS" add the following:

89/00315  1/1989  WIPO

Col. 3,   line 15, change "CO" to --C0--.

Col. 7,   line 50, change "part 9'''" to --part 9'--.

Col. 9,   line 19, change "DO" to --D0--.

Signed and Sealed this

Twenty-fourth Day of June, 1997

Attest:

BRUCE LEHMAN

*Attesting Officer*   *Commissioner of Patents and Trademarks*